Figure 2:
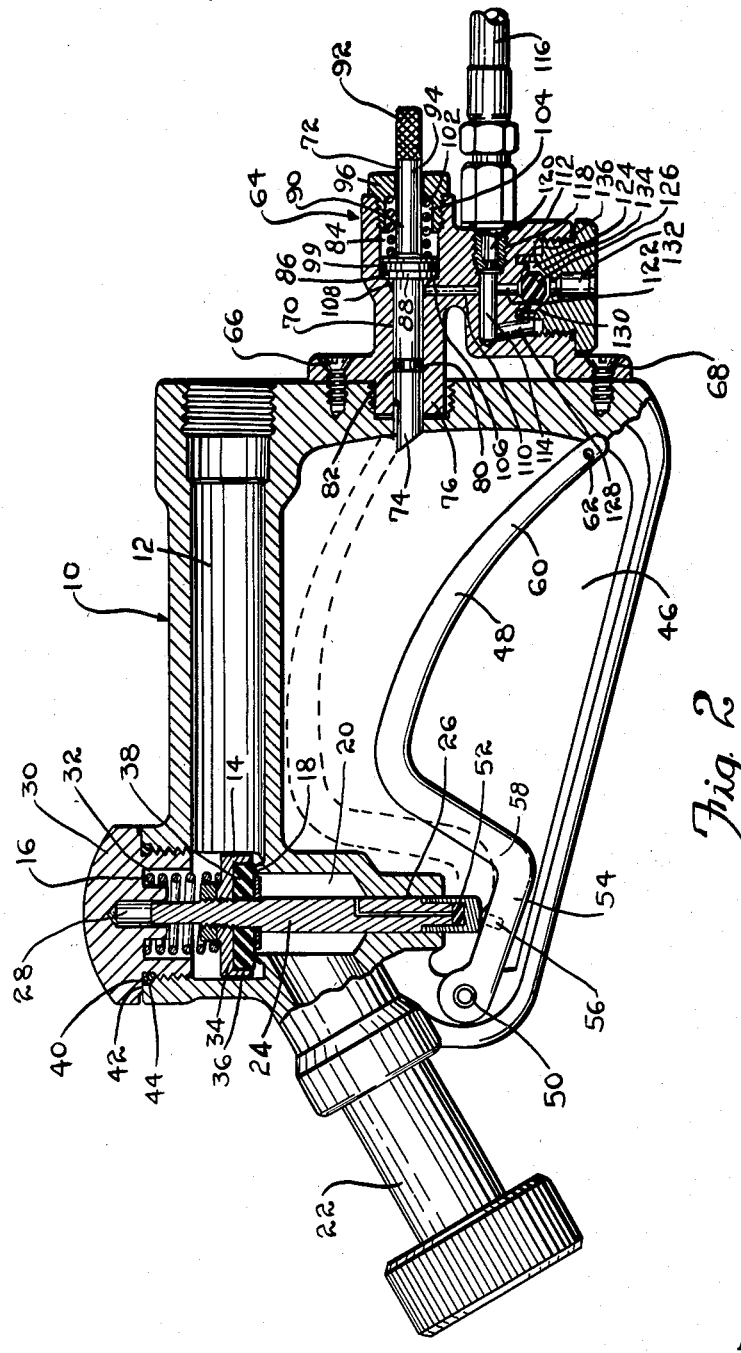

June 25, 1963   H. G. HANSON ETAL   3,094,849
PRESSURE FILLER CONTROL
Original Filed Jan. 7, 1957   2 Sheets-Sheet 1
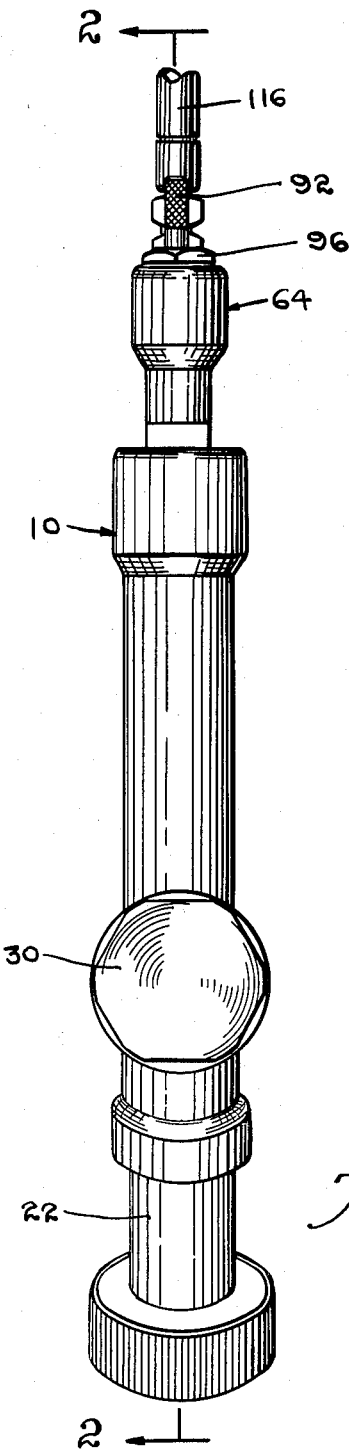
Fig. 1
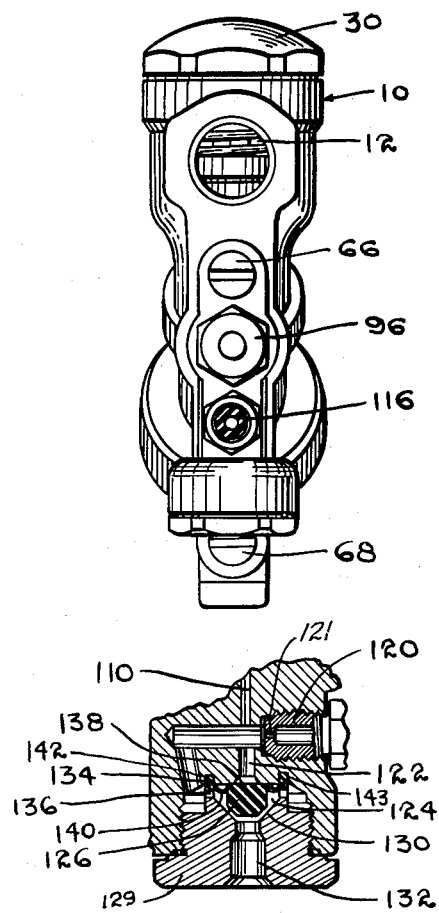
Fig. 3
Fig. 4
INVENTORS.
Herbert G. Hanson
Robert E. Poethig
BY
Atty.

INVENTORS.
Herbert G. Hanson
Robert E. Poethig

United States Patent Office 3,094,849
Patented June 25, 1963

3,094,849
PRESSURE FILLER CONTROL
Herbert G. Hanson, Chicago, and Robert E. Poethig, Glenview, Ill., assignors to The Bastian-Blessing Company, Chicago, Ill., a corporation of Illinois
Original application Jan. 7, 1957, Ser. No. 632,824, now Patent No. 2,916,060, dated Dec. 8, 1959. Divided and this application Sept. 24, 1959, Ser. No. 842,162
2 Claims. (Cl. 62—51)

This invention relates to automatic shut-off valves and more particularly to means for terminating the flow of liquid gas to a container upon attainment of a predetermined level in the container. This application is a division of our Patent No. 2,916,060, Serial No. 632,824, filed January 7, 1957.

The invention is an improvement on the automatic shut-off device disclosed in the copending application, Serial No. 539,721, filed by Harry J. Williams, October 11, 1955, Patent No. 2,970,601. In that device, expansion means were disclosed for actuating a latch-release means adapted selectively to dispose a valve opening means in position to open the valve and, upon introduction into contact with the expansion means, to afford release of the valve into closing position. The present invention is independent of any predetermined pressure and temperature differential between the liquid introduced against the said expansion means and a liquid contained in the expansion means, such as is utilized in the said Williams structure. As such, it has application in situations where the circum-ambient temperatures may be rather variable, and also has the further advantage that once an initial level of liquid has been achieved, closing of the shut-off valve will be produced immediately.

It is, accordingly, an object of the present invention to provide an automatic shut-off valve having means adapted to vent vapor introduced into association therewith during filling of a container and prior to attainment of a predetermined level therein, and to create a pressure condition when the said level has been attained and in response to vaporization of liquid introduced thereagainst whereby to release the shut-off valve into closing position by simple mechanical actuation of a latch-release means.

Another object of the invention is to provide a shut-off valve as described, wherein the said mechanical means comprises a piston slidably mounted in the valve and means in position to open the valve during filling of the container to the desired level, and adapted to retract with the piston in response to the creation of the aforementioned pressure condition.

Another object of the invention is to provide a shut-off valve as described wherein the means for creating the pressure condition comprises a valve adapted to vent vapor during the filling of the container preferably under venturi conditions which minimizes possibilities of false closings, and to close when vapor pressure is increased in response to vaporization of the liquid introduced thereagainst at the time the said predetermined level is attained preferably under jetting conditions which automatically eliminate venturi conditions and assures closing of the valve.

Another object of the invention is to provide a valve for creating a pressure condition as described, having a resilient annular support element which is responsive to vapor pressure during the filling process to vent the vapor while at the same time keeping the valve open as long as vapor conditions persist, the valve being adapted to ride downwardly with a snap action into sealing position upon said predetermined pressure being exceeded.

Other objects and advantages of the invention will become apparent as the description proceeds in accordance with the drawings, in which:

FIG. 1 is a plan view of the shut-off valve in accordance with the present invention;
FIG. 2 is a vertical sectional view taken through the lines 2—2 of FIG. 1;
FIG. 3 is an end view of the valve shown in FIGS. 1 and 2; and
FIG. 4 is an enlarged view of a portion of the sectional view shown in FIG. 2.

Referring now to FIGS. 1 through 3, the tank-filling apparatus includes a valve body 10 adapted for use with a tank-filling apparatus and tank such as is shown in the aforementioned co-pending application, Serial No. 539,721, and includes a longitudinally extending bore 12 threaded to receive a pipe line and a valve 14 biased by a helical spring 16 into sealing relationship with a valve seat 18 so as to be in the path of flow of liquid introduced by the aforementioned pipe line as it passes through the passage 12 and into a chamber 20, thence to be introduced into a tank through a tail-piece 22.

The valve 14 is guided vertically by means of a valve stem 24 having its lower end received in a bore 26 and its other end in a bore 28 defined in a cap 30 threadedly received in the valve body 10 and defining also an annular recess 32 for receiving the upper end of the helical spring 16, the lower end of the spring being adapted to seat upon a metallic disc 34 having a depending annular flange 36 in which is received a resilient sealing disc 38. In order to insure effective sealing relationship between the cap 30 and the valve body 10, a gasket or O-ring 40 is provided between the head portion 42 of the cap and an annular recess 44 in the valve body which may be compressed slightly by the engagement of the cap in the valve body for more effective sealing. The lower portion of the valve body 10 defines a relatively large compartment 46 into which the lower portion of the valve stem 24 extends; and in order to permit selective seating and unseating of the valve 14, a lever 48 is pivotally secured by means of a roll pin 50 within the compartment and upon the body 10, adjacent the said lower extremity of the valve stem. Suitable bleed valve means 52 are also provided within the valve stem 24 as set forth in the Larkin et al. Patent No. 2,884,024 which has the status of a co-pending application filed concurrently herewith. The lever 48 includes a straight portion 54 which extends into the compartment for a short distance and carries a rivet 56 adapted to engage the lower end of the valve stem 24 as hereinafter further described. The lever then extends upwardly at 58 and is provided with an elongate arcuate handle portion 60 carrying a pin or grip portion 62 at its outer extremity.

In order to selectively position the lever 48 in valve-opening position as shown in broken lines, an automatic check unit assembly 64 is provided which is secured to the valve body 10 by means of bolts such as the bolts 66 and 68. The automatic check unit assembly 64 defines a bore 70 which receives slidably therein a piston means 72 carrying a latch 74, which in its normal position, as hereinafter set forth, is adapted to engage the handle 48 by means of its pin or complementary latch 62. The latch or thrust element 74 extends through the housing 10 as preferably supported by means of a sleeve-like boss portion 76 secured in place on the valve body 10. In order to preserve the effective seal between the compartment 46 and the bore 70, an O-ring 80 may be secured on the latch member 74 by means of an annular groove 82 therein.

The latch 74 extends to an inner end of the bore 70 in a relatively enlarged portion thereof designated by numeral 84, and is secured to a drum or piston element 86 secured on the shank of the piston 90 whose outer end 92 is knurled for manual manipulation and whose shank 94 is of relatively reduced diameter and slidably received in a cap 96 threadedly received in the enlarged portion 84. The head 88 is circumferentially grooved to receive an O-ring or other suitable sealing element 99 to seal the piston head with the cylinder wall with an initially rolling contact inherent in the O-ring for easy initial movement.

In order to bias the piston head and hence latch 74 into the position shown in full lines in FIG. 2 to abuttingly engage the pin 62, a helical spring 102 is axially aligned on the shank portion 94 of the pin 90, with its inner end abutting the disc 86 and its outer end received in an annular recess 104 defined in the cap 96. It will be noticed that the piston head 86 is, as stated, relatively enlarged as compared with the bore 70, and an annular shoulder 106 is defined in the enlarged portion 84 to abuttingly engage the head 88 in its normal position as shown. The bore 70 gradually tapers outwardly to approximate the dimensions of the bore, as shown at 108 to provide a chamber therearound.

In order to provide for selective retraction of the piston 72, a passageway 110 is cross-drilled in the assembly body 112, which leads into and through a longitudinal passageway 114 connected to an outage hose 116 for successively receiving vapor and liquid from the storage tank being filled in the manner set forth in the aforementioned copending Williams application. The hose 116 is secured within a threaded recess 118 in the body 112 by means of a nozzle 120 having a jet opening 121 and it will be noted that the passageway 110 includes a downward extension at 122 which opens into a peripherial space or chamber 124 surrounding a resilient valve element 126 hereinafter further to be described. The element 126 is held in place by a sleeve or valve nut 129 having a tapering valve seat 130 therein facing the resilient valve 126 and an outlet 132 therefrom opening to atmosphere.

The valve seat 126 defines an annular rim 143 having depending legs 136 integral therewith which support the valve seat 126 in place while still providing passages through the rim between the legs.

The valve seat portion 126 is in turn supported on the rim 143 for cooperation with the conical surface 130 by means of a flexible annular interstitial support web 140, which urges the valve 126 away from the conical surface 130, with the upper end of the rim 136 held in centered relationship within an annular recess 142. A passage 128 outside the rim is drilled to meet the passage 114 to place it in communication with the atmosphere through the openings between the legs 136 and through the normally open valve 126.

In this connection it should be observed that preferably, the jet opening is in close proximity to both portions of the passageway 110 and discharges at right angles thereto across their openings to provide a venturi effect while vapor is passing through the nozzle. This tends to keep the piston 86 in latching position and the valve 126 open. However, when liquid is discharged through the jet opening, the venturi action ceases, the liquid hits the end of the passage 114, absorbs latent heat and vaporizes to provide a high back pressure in all passages communicating with passage 114 with not enough flow area between legs 136 to relieve it to atmosphere, thereupon the valve 126 is snapped shut and the full vapor pressure of the liquefied gas is applied to the inner face of the latch piston 86 to overcome the spring 102 and release the latch.

The operation of the device is as follows: When a container to be used with the valve 10 is being filled with a liquefied gas, vapor produced thereby is introduced through the conduit 116 and the passageway 114 at 122, into the passage 128, where the vapor flows around the resilient valve element 126, radially enters into chamber 124 and is permitted to escape into the outlet 132. When the container is filled to a predetermined limit, however, such as a 10% outage level, liquid gas will be drawn upwardly into the hose 116 through a suitable clip pipe in accordance with the method described in the aforementioned co-pending Williams application, and will enter the enclosure 114 defined by the body portion 112, where it will vaporize as a result of the low pressure conditions encountered there. This vaporization as already described will produce a pressure sufficient to act through the passage 122 to depress the valve 126 so that it will seat on the valve seat 130 and close off the outlet 132. Since no further escape means is provided for the pressure of vaporization, the plunger or piston 72 will be pushed outwardly of the enclosure 112 and of the valve body 10, pulling with it the latch member 74 so as to release the pin 62 and the handle 48 carrying the pin for downward pivotal movement to the position shown in solid lines. As stated, when the latch or handle 48 is in the position shown in broken lines, the valve 14 will be open so as to admit fluid into the container being filled. Upon the aforementioned downward movement of the handle 48, the valve will close immediately without the need for intervening expansion of a pressure responsive element or any other action except the described retraction of the piston 72. The handle may be reset manually as by the pin 62, which may be received in a suitable slot in the body portion 10, or by moving the handle directly within the chamber 46. Thereupon the process may be repeated without danger of break-down and positive valve closing action such as to maintain the desired level within desirably close tolerances is provided. Moreover, if at any time it is desired to stop filling instantly, the knurled end 92 need only be pulled to effect the same closure of the valve 38 already described.

Although we have herein set forth and described the invention with respect to certain specific principles and details thereof, it will be obvious to those skilled in the art that these may be varied without departing from the spirit and scope of the invention as set forth in the hereunto appended claims.

What is claimed is:

1. The method of expanding an expansible chamber under pressure comprising alternately injecting liquefied gas in its vapor phase and its liquid phase at a constant volume of flow thereof into a confined space adjacent to said chamber and in communication therewith, reducing the pressure in the chamber by aspirating fluid from said chamber by the flow of vapor phase gas injected into said confined space, halting said aspiration and said reduction of pressure by the injection of liquid phase gas into said confined space for the absorption of latent heat of vaporization from the walls of said space to vaporize said injected liquid phase gas in said space to increase the resultant amount of vapor and the pressure exertible thereby in said chamber above that induced by said injection of vapor phase gas alone, and venting vapor from said space at substantially constant volume of flow equal to the volume of flow of vapor injected into said space to accumulate in said space and chamber for brief periods of time portions of said increased amounts of vapor during liquid phase injection to develop a pressure increase in said space for expanding said chamber.

2. The method defined in claim 1 in which venting said vapor from said space is controlled, and halting said venting when said pressure developed in said space exceeds a predetermined pressure.

References Cited in the file of this patent
UNITED STATES PATENTS 2,889,688   Jones et al. _____ June 9, 1959
2,906,301   Mannon _____ Sept. 29, 1959